Figure 1:
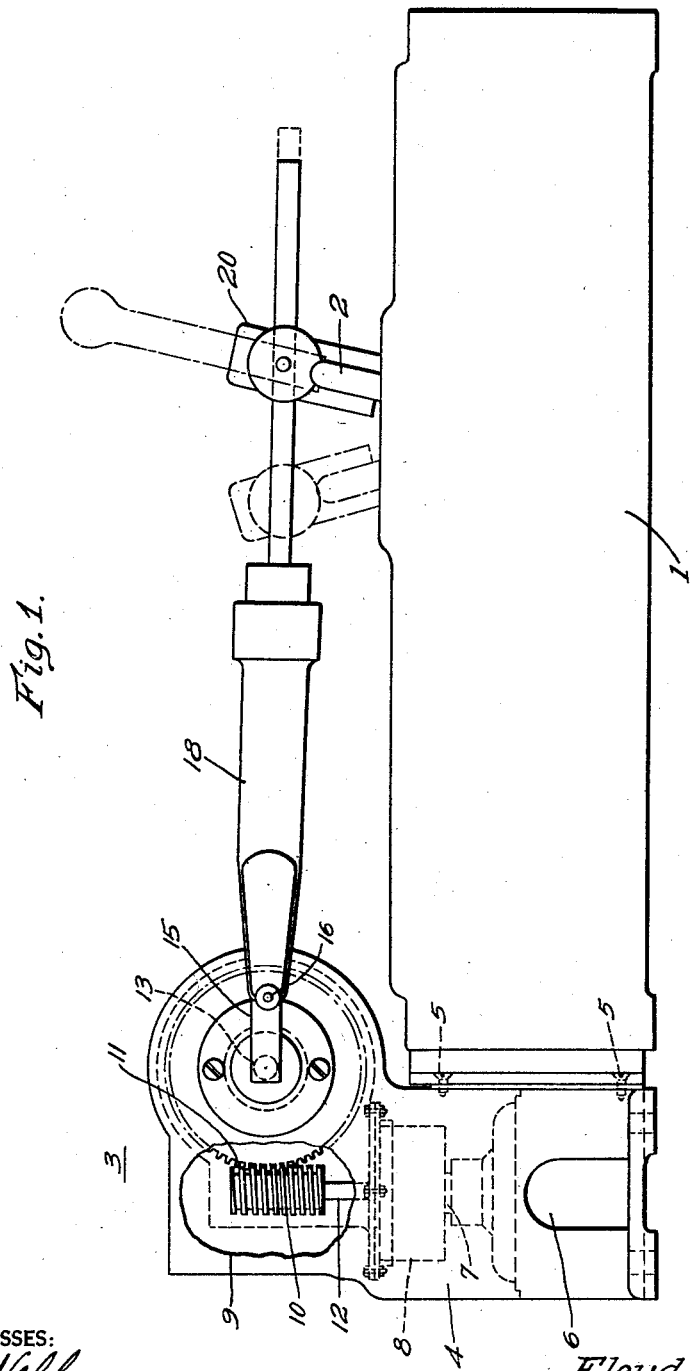

Oct. 10, 1939.  F. D. JOHNSON  2,175,897
BRAKE MECHANISM
Filed April 24, 1936  2 Sheets-Sheet 2

WITNESSES:
C. J. Weller
Walter E. Mueller

INVENTOR
Floyd D. Johnson.
BY F. W. Lyle.
ATTORNEY

Patented Oct. 10, 1939

2,175,897

UNITED STATES PATENT OFFICE 2,175,897

BRAKE MECHANISM

Floyd D. Johnson, Wilkinsburg, Pa., assignor to Westinghouse Electric & Manufacturing Company, East Pittsburgh, Pa., a corporation of Pennsylvania Application April 24, 1936, Serial No. 76,165

4 Claims. (Cl. 188—135)

This invention relates to motor driven operating mechanisms for circuit breakers and more particularly to a brake mechanism for bringing the motor to rest after each operation of the breaker by the operating mechanism.

In the operation of distant circuit breakers by means of a motor and in many other similar situations, it is important that after each operation the motor be stopped in a position which is very nearly the same each time. Heretofore it has been usual to accomplish this by combining a spring actuated brake with a solenoid in series with the motor, whereby the brake is set when the current is shut off from the motor.

It has been found that the operation of prior art mechanisms of this type is not entirely satisfactory, particularly when there is considerable variation in the load of the motor being controlled.

In an application of Ture Lindstrom for a Motor driven circuit breaker operating mechanism, Serial No. 58,387, filed January 16, 1936 and assigned to the assignee of this application, the brake mechanism is directly responsive to the speed of rotation of the driving motor in contradistinction to the direct response of the brake mechanism to the flow of current in the motor as practiced in the devices of the prior art. As fully described in the aforesaid application, the motor braking mechanism comprises a plurality of centrifugally actuated brake shoes adapted to be brought into frictional engagement with a cooperating fixed braking surface when the driving motor exceeds a predetermined speed.

In the instant invention the brake mechanism is also directly responsive to the speed of rotation of the driving motor but utilizes a different fundamental principle of operation. Broadly, the structure to be hereinafter fully described utilizes the inertia of a rotating mass which is responsive to a change in the speed of rotation of the driving motor as a result of the motor being disconnected from its source of current supply to actuate a movable brake surface into engagement with a cooperating fixed brake surface for bringing the motor to rest.

It is an object of my invention to provide in motor driven operating mechanisms for circuit breakers for the stopping of the mechanism by means of the motion of the mechanism itself independent of the supply of energy to the driving motor.

It is a further and more specific object of my invention to accomplish the automatic setting of a brake by means which are inexpensive to manufacture and are simple and reliable in operation.

It is a further object of my invention to employ a cam device actuated by the acceleration or retardation of the shaft to set the brake.

It is a further object of the invention to provide an inertia device for actuating the cam.

It is still a further object of my invention to provide for using such an inertia device in either of two directions of operation.

Figure 2:
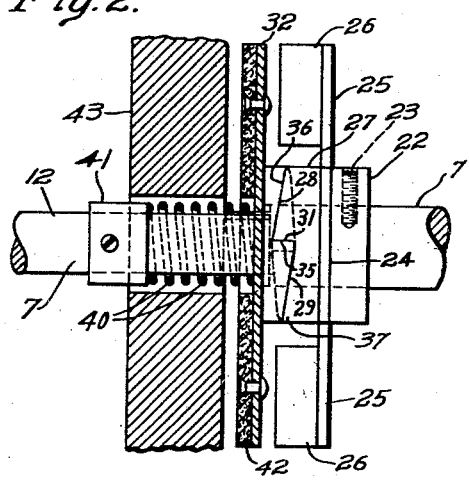
Figure 3:
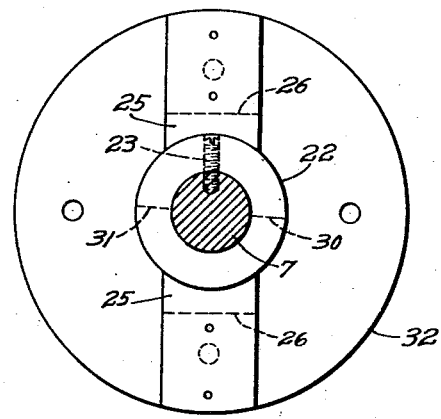
Figure 4:
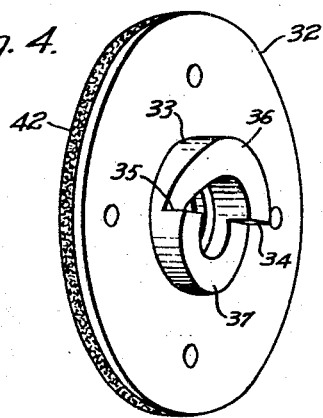
Figure 5:
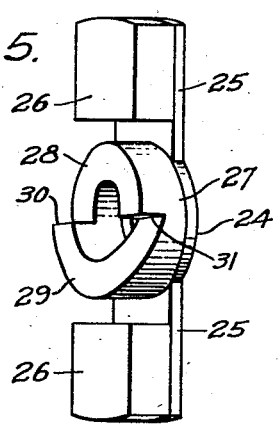
Figure 6:
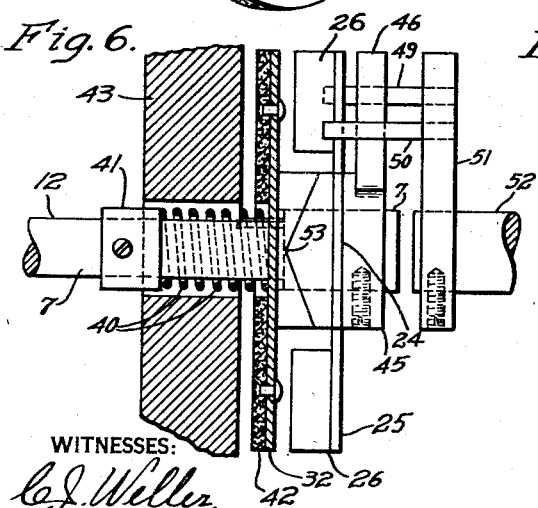
Figure 7:
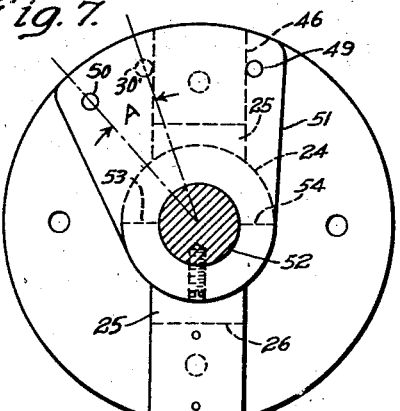

Other objects of the invention and details of the structure of the apparatus will appear more fully from the following description and the accompanying drawings, in which Figure 1 is a side elevational view showing a circuit breaker embodying the motor driven operating mechanism of my invention, Fig. 2 is a side elevational view along the shaft, partially in section, of one form of brake structure employed in the operating mechanism, Fig. 3 is an end view of the device illustrated in Fig. 2, Fig. 4 is a perspective view of the disk equipped with brake lining and with one cam, forming part of the brake structure, Fig. 5 is a perspective view of the inertia device and the other cam, forming another part of the brake structure, Fig. 6 is a side elevational view along the shaft, partially in section, of a modified form of brake device, and Fig. 7 is an end view of the form of brake shown in Fig. 6.

In the drawings the numeral 1 designates a circuit breaker of the type shown in Baker Patent No. 2,025,697, issued Dec. 24, 1935, having an operating lever 2 movable between predetermined positions for operating the breaker contacts, not shown, to open and closed positions with a snap action. The motor driven operating mechanism for actuating the lever 2 is generally shown at 3 and comprises a frame member 4 which may be releasably attached to the breaker casing 1 by means of screws 5. Within the frame member 4 is mounted a driving motor 6 having one end of its shaft 7 extending through a brake housing 8.

The housing 8 is mounted, as shown, upon a gear casing 9 enclosing a worm 10 and worm gear 11 operatively in mesh with each other. The worm 10 is operably coupled to the reduced end portion 12 of the motor shaft 7. The worm gear 11 is fixedly secured to a shaft 13, one end of which extends exteriorly of the casing 9 and is provided with a crank arm 15 having a crank pin 16. An actuating rod 18 is operatively pivoted to the crank pin 16 at one end and releasably secured to a coupling member 20 at the other end. The coupling member 20 is in turn secured to the breaker operating lever 2.

It will be apparent that as the crank arm 15 is rotated by virtue of its operative connection with the driving motor 6, reciprocating motion will be imparted to the actuating rod 18 and thence to the operating lever 2 whereby the latter is moved to open and closed positions. The positions are indicated in Fig. 1 by the full line and dotted lines, respectively. In order to accurately stop the operating mechanism in either the open or closed position I employ a brake mechanism within the housing 8, which mechanism is shown in detail in Figs. 2 to 5.

As illustrated, the shaft 7 is directly operated by the motor 6. However, the shaft may be indirectly operated by the motor, for example, by gearing or other suitable mechanism. The reduced end portion 12 of the shaft 7 facilitates the assembly of the device as will appear more fully hereinafter.

A collar 22 secured upon the shaft by a set screw 23 or equivalent means, is employed to limit the longitudinal movement of a collar 24 which is slidable and rotatable upon the shaft. Two arms 25 extending from the collar 24 carry weights 26. Concentric with the collar 24 and rigid therewith is a cam member 27 which includes two cam surfaces 28 and 29 and two shoulders 30 and 31 separated from one another. The internal diameter of the collar 24 and of the cam member 27 is sufficient to enable them to be placed upon the larger portion of the shaft 7.

A plate 32 is splined upon the reduced portion 12 of the shaft 7 adjacent to the weighted member. The central portion of this plate carries a cam member 33. In the form illustrated in Figs. 2 to 5, the cam has two shoulders 34 and 35 separated by oblique cam portions 36 and 37. The central opening of the cam member 33 is equal to that of cam member 27 and larger than that in the plate 32 which fits the portion 12 of the shaft 7. The cam portion 36 matches the cam portion 28 so that the shoulder 35 fits against the shoulder 31. When the plate is in position with the parts fitting in engagement, it is held there by the spring 40 which is secured in place by a collar 41. Brake lining 42 is secured to the face of the plate 32 remote from the cams. When the plate is held by the spring, as just described, the brake lining 42 is out of contact with a member 43 of the housing 8 through which the shaft extends.

In the operation of this form of the device, the intended direction of rotation is clockwise as seen in Fig. 3. When the shaft rotates, the spring 40 causes the inertia device comprising the weights 26, the plate 25 and the collar 24 to rotate with it because the spring holds the shoulders 35 and 31 or 34 and 30 in engagement.

When the operating mechanism driven by this device has finished its work, or in other words has actuated the breaker 1, either to open or closed position, power is automatically cut off from the motor. The load, however, is continually applied with the result that the rotation of the shaft 7 is checked. When this occurs, the inertia device continues to travel around the shaft at a speed approximately equal to that which it had before the shaft was checked, but the plate 32, because it is splined to the shaft 12, is checked. There is thus relative rotation between the inertia device and the plate 32.

Such relative motion causes the cam surfaces to travel over one another, the cam 28 riding on the cam 36 and the cam 29 on the cam 37. The action of the cam surfaces causes the plate 32 to recede from the collar 24. In doing so it compresses the spring 40 and brings the brake lining 42 into contact with the stationary cooperating brake or frame member 43.

The plate 32 is then arrested by friction between the brake lining 42 and the frame member 43. Being splined to the shaft its arrest checks the shaft. Thus a slight checking of the shaft results in a more effectual checking by means of the brake lining 42 and the shaft is brought to rest promptly so that it comes to rest a very short angular distance from where the first braking action of the brake lining against the frame occurred.

When the parts have ceased to rotate the spring 40 acting against the plate 32 will restore it to its original position with the cam surfaces 28 and 36 engaged throughout their length and their shoulders 30 and 34 in engagement. The parts are then ready to be started again. The shoulders 31 and 35 and the shoulders 30 and 34 act to positively drive the weights 26 as long as the shaft is accelerating or while it is rotating at a steady speed.

In the form illustrated in Figs. 6 and 7 the shaft 7, its reduced portion 12, and the inertia devices 25 and 26 are as already described. The shaft 7 is not however directly driven but is connected to the motor 6 through a lost motion device described below. The collar 45 is secured against rotation on the shaft 7 but it is equipped with an arm 46 which extends between two pins 49 and 50 which extend far enough to engage the inertia device 25. The pins 49 and 50 are secured upon a sector 51 which is mounted upon a shaft 52. The shaft 52 is driven by the motor either directly or through a cam, a crank or other gearing device. It is capable of rotation in either direction.

Upon the shaft 7 cams are mounted, one secured to the inertia device 25 and the other to the brake plate 32, but these cams differ from those described in connection with Figs. 2 to 5 in that they have no abrupt shoulders and have two cam surfaces each extending through half of a circumference. From the bottom 53 of one valley to the bottom 54 of the other valley of the cam on plate 32 is half of a circumference and between the two bottoms each cam surface is an oblique plane.

The cam surfaces on the inertia device 25 fit those on plate 32. Thus they also are two oblique planes making high points where the cams on plate 32 have the bottoms 53 and 54 of its valleys and having bottoms of its valleys halfway between; that is to say, at the top and bottom of the view of cams seen in Fig. 6. The angular distance between the two pins 49 and 50 is such that relative travel of the sector 51 must be through an angle A to cause one pin to leave one edge of the arm 25 and the other pin to engage the other edge thereof.

In the operation of this form of the device, if the motor starts and drives the shaft 52 in a counterclockwise direction, as seen in Fig. 7, the pin 49 will come into contact with the edge of the arm 46, if it is not already in contact therewith, and thereafter it will push the arm 46 and the arm 25, whereby the shaft 7 will be turned in the same direction as the shaft 52 and the inertia device will be rotated at the same speed.

When the parts have acquired a steady speed they will run without further relative rotation until the travel of the shaft 7 is checked upon the activation of the breaker contacts to either open or closed position, at which time power is preferably shut off from the motor driving shaft 52. When this occurs the plate 32 is checked by the shaft 7, due to the load connected thereto and the plate 25, carrying the weights 26 continues to travel by its inertia and thus there is relative motion between the two cam members. This will cause the plate 32 to move toward the left (Fig. 6), compressing spring 40 and causing engagement between the brake lining 42 and the cooperating frame portion 43.

There results a further checking of the shaft 7 and if the shaft 52 has not already stopped, contact between the pin 49 and with the edge of the plates 25 and 46 will be renewed if it has been broken. The shaft 52 will then be checked by the braking action on shaft 7 acting through pin 49 and will be brought to rest within a very short angular distance from the position when the shaft 7 was first checked.

If the parts are in the position illustrated in Fig. 7 when the device is at rest and the shaft 52 is started in a clockwise direction, the first effect is to bring the pin 50 into the position 50' shown in dotted lines on the other side of the angle A, in contact with the edge of the arms 46 and 25. The arm 46 driven by the pin 50 then drives the shaft 7 in synchronism with the shaft 52. It also drives the arm 25 and when the parts have acquired a steady state of rotation they will continue in this relative position. If now the power is cut off from the motor, the shaft 52 continues to run under its momentum because the rotor of the motor has high inertia and the motor and its shaft 52 have low friction. The load, however, continues to be applied to shaft 7. Hence the arm 46 will be checked because it is keyed to shaft 7 and the pin 50 will be kept in contact with arm 46, and the checking will be transmitted thereby to shaft 52 and the motor.

The inertia device is not checked by the action just described and will continue substantially at its old speed. Relative motion of the cam surfaces will thus occur and the brake lining 42 will be brought into contact with the stationary part 43 of the frame. The checking which results is transmitted through the plate 42 and arm 46 to segment 51 and so to shaft 52.

If the shaft 7 is checked by other causes than shutting off power from the motor, for example, by additional load on the shaft, the inertia device 25 continues to move toward pin 49 and thus relative motion between the cam members occurs with the result that shaft 12 is brought promptly to rest and shaft 52 is stopped by pin 50 engaging arm 46.

It will thus be evident that with the form shown in Fig. 6, if the device is rotated in either direction when the shaft 12 is checked, the brake acts to bring it quickly to rest.

From the foregoing description it will be apparent that I have provided a motor driven operating mechanism for circuit breakers of simple and rugged construction which employs the motion of the mechanism itself for bringing it to rest independently of the supply of energy to the driving motor. It will also be apparent that the particular brake mechanism herein described in connection with a motor driven operating mechanism for circuit breakers is applicable for controlling the rotation of other mechanisms.

Also various modifications of the brake mechanism will occur to those skilled in the art and I do not wish to be limited to the exact construction shown and described.

I claim as my invention:

1. The combination with a driven shaft of means for bringing said shaft to rest comprising a fixed brake member, a cooperating brake member rotatable with said shaft and normally held out of engagement with said fixed brake member, an inertia member free to rotate on said shaft, means for positively rotating said inertia member with said shaft, said last-named means enabling the inertia member to lead the movement of said shaft during deceleration thereof, and means responsive to the relative displacement of the shaft and inertia member for operating said cooperating brake member into engagement with said fixed brake member to bring said shaft to rest.

2. In a driving device, a driven shaft, a stationary member, a brake member driven by said shaft, an inertia member free to rotate on said shaft, a positive driving connection between said shaft and said inertia member, said connection being releasable at least during the deceleration of said shaft for causing said inertia member to lead the movements of said shaft, and cam means responsive to the relative displacement of the shaft and inertia member for moving said brake member into engagement with said stationary member to bring said shaft to rest.

3. In a braking device, a shaft, a brake element adapted for positive rotation with said shaft, a cam surface on said brake element, an inertia device, a cam surface thereon adapted to cooperate with the cam surface on the brake element, a spring holding said cam surfaces in engagement, a positive driving coupling between said brake element and said inertia device, means for preventing relative rotation between the brake element and the shaft, the inertia device being capable of rotation on said shaft, such relative rotation occurring upon change of speed of the shaft to produce relative movement between said cam surfaces thereby actuating said inertia device against said spring and moving said brake element along said shaft, and a stationary member engaging said brake element when so moved to brake the shaft.

4. In a brake setting device, a stationary member, a driving shaft, a driven shaft, a brake member rotating with the driven shaft, a lost-motion device through which the driving shaft drives the driven shaft, an inertia device rotatably mounted on the driven shaft and driven through said lost motion device and means actuated by said inertia device upon checking of the driven shaft and cessation of power on the driving shaft to move the brake member into cooperating relation with the stationary member.

FLOYD D. JOHNSON.